(12) United States Patent
Ma

(10) Patent No.: US 6,439,662 B2
(45) Date of Patent: Aug. 27, 2002

(54) SPINDLE FOR A HEIGHT REGULATING DEVICE

(75) Inventor: Dong Kwan Ma, Kyonggi-Do (KR)

(73) Assignee: Samhongsa Co., Ltd., Seoul (KR)

( * ) Notice: Subject to any disclaimer, the term of this patent is extended or adjusted under 35 U.S.C. 154(b) by 0 days.

(21) Appl. No.: 09/849,496

(22) Filed: May 7, 2001

(30) Foreign Application Priority Data

Jun. 19, 2000 (KR) .............................................. 00-17322

(51) Int. Cl.[7] .................................................. A47C 3/30
(52) U.S. Cl. .................. 297/344.19; 248/161; 248/631; 188/322.19
(58) Field of Search ...................... 297/344.19; 248/161, 248/404, 631; 188/322.19

(56) References Cited

U.S. PATENT DOCUMENTS 5,620,067 A * 4/1997 Bauer et al. ........... 188/322.19
6,241,316 B1 * 6/2001 Jean et al. ............. 297/344.19
6,276,756 B1 * 8/2001 Cho et al. .............. 297/344.19

* cited by examiner

*Primary Examiner*—Anthony D. Barfield
(74) *Attorney, Agent, or Firm*—McGuireWoods LLP

(57) ABSTRACT

A spindle base which constitutes a height regulating device of a chair, and it is an object of the present invention to improve the corrosion resistance, the abrasion resistance, the fatigue strength, and the reverse bending stress of the spindle body by coating a nitration layer of a predetermined thickness on the inner and outer surfaces of the spindle base. A height regulating device gas comprises a spindle base, a cylinder formed in the spindle base, a piston slidably moved in the cylinder, and a spindle having a piston rod having one end connected to the piston. The other end of the piston rod is fixed to one end of an outer case and the spindle is moved upward and downward through the outer case based on the piston rod and the outer case. The spindle base is comprised of a metal and nitration layers are formed on the inner and outer surface of the metal.

7 Claims, 2 Drawing Sheets

PRIOR ART

SPINDLE FOR A HEIGHT REGULATING DEVICE

BACKGROUND OF THE INVENTION

1. Field of the Invention

The present invention relates to a spindle base of a height regulating device which can be used for a height regulated chair or a table, and more particularly to a spindle base which is formed in multi-layers by processing the inner and outer surfaces of a metal layer which constitutes the spindle base by using a nitration layer.

2. Description of the Prior Art

In general, a height regulating device used in a chair or a table includes a spindle 50 installed in a tube guide 55 installed in a cylindrical outer case 60 as shown in FIG. 1. The spindle 50 includes a spindle base 80, a cylinder 30 installed in the interior of the spindle base and filled with nitrogen gas in a predetermined pressure, a piston 11 which divides the cylinder to a first chamber 30a and a second chamber 30b, and a pipe holder 70 which has a gas opening/closing pin 20 for flowing the gas in the first chamber 30a and the second chamber 30b.

The piston 11 is fixed to one end of the piston rod 10, and the other end of the piston rod 10 is fixed to an end of the outer case 60 by using a fixing means 40.

Since the interior pressure of the cylinder 30 is higher than the atmospheric pressure, if the gas opening/closing pin 20 is opened by pushing a button 33 so that the gas in the first chamber 30a and the second chamber 30b is moved through the gas inlet and outlet 16, the piston 11 is moved in the cylinder 30 by the pressure of the gas and the spindle is moved along the inner surface of the tube guide 55 to regulate the height of the height regulating device.

In the above-mentioned spindle, if the load applied from outside is not parallel to the axis, a reverse bending stress is generated on the contact surface of the spindle base 80 and the tube guide 55.

Especially, in the above-mentioned conventional spindle base 80, the spindle base of comprised of a single metal layer of aluminum and iron, the spindle base 80 becomes slim and a crack is generated in the spindle base 80 according to the generation of the reverse bending stress.

The problem of the spindle generated due to the reverse bending stress can be settled by making the thickness of the spindle base thick or using an expensive metal or forming a coating layer of a high hardness only on the outer surface of the spindle base.

However, in the above-mentioned methods, the fatigue stress of the metal cannot sufficiently satisfy or the manufacturing cost is increased.

SUMMARY OF THE INVENTION

The present invention has been made to solve the above-mentioned problem, and accordingly it is an object of the present invention to provide a spindle base which can improve the strength of the spindle base, the abrasion resistance, the corrosion resistance without enlarging the thickness of the spindle base by processing the surface of the spindle base with a nitration layer.

In order to achieve the above-mentioned object, the present invention provides a height regulating device gas which comprises a spindle base, a cylinder formed in the spindle base, a piston slidably moved in the cylinder, and a spindle having a piston rod having one end connected to the piston and in which the other end of the piston rod is fixed to one end of an outer case and the spindle is moved upward and downward through the outer case based on the piston rod and the outer case, wherein the spindle base is comprised of a metal and nitration layers are formed on the inner and outer surface of the metal.

The spindle base is comprised of iron. The thickness of the metal of the spindle base is 2.5 to 5 times of the sum of the thicknesses of the nitration layer of the inner surface and the nitration layer of the outer surface. The thicknesses of the nitration layer of the inner surface and the nitration layer of the outer surface are 200 to 400 $\mu$m. The thickness of the nitration layer of the outer surface is equal to or greater than the thickness of the nitration layer of the outer surface.

The nitration layer is formed by stacking nitration layers having different hardness and the hardness of the outer side of the nitration layer is greater than the hardness of the inner side. The thickness of the outside of the nitration layer is 10 to 20 $\mu$m.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Hereinafter, a spindle base according to the present invention will be explained in detail with reference to FIGS. 2 and 3.

Figure 1:
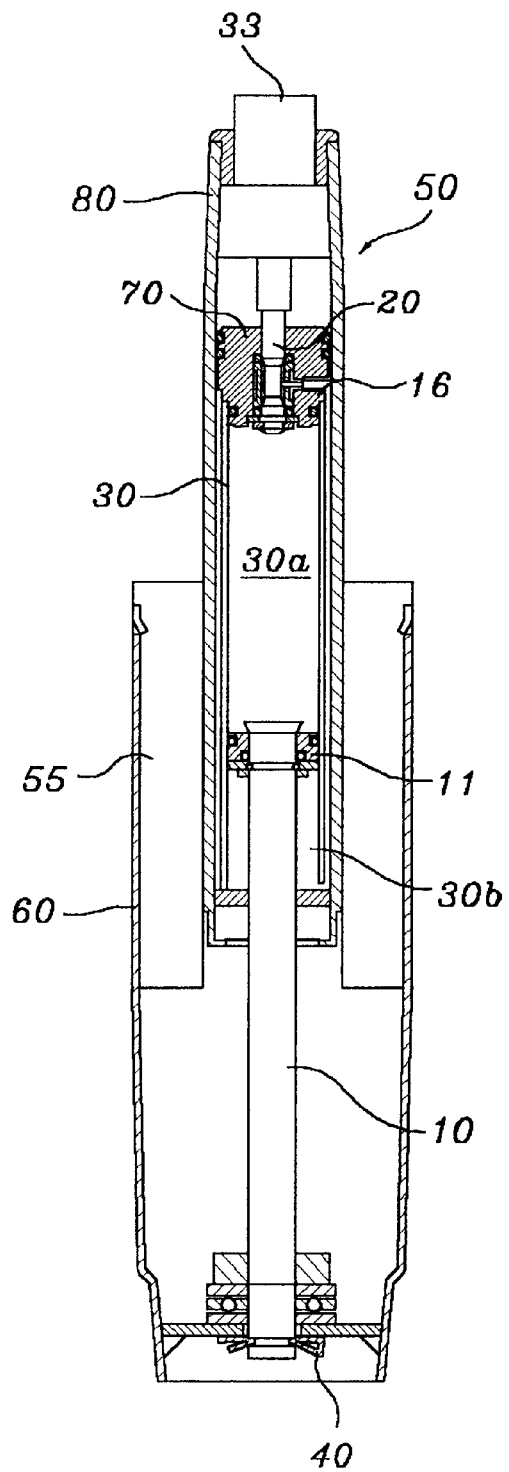
FIG. 1 is a cross-sectional view of the Prior Art, for showing a general gas cylinder type height regulating device.
Figure 2:
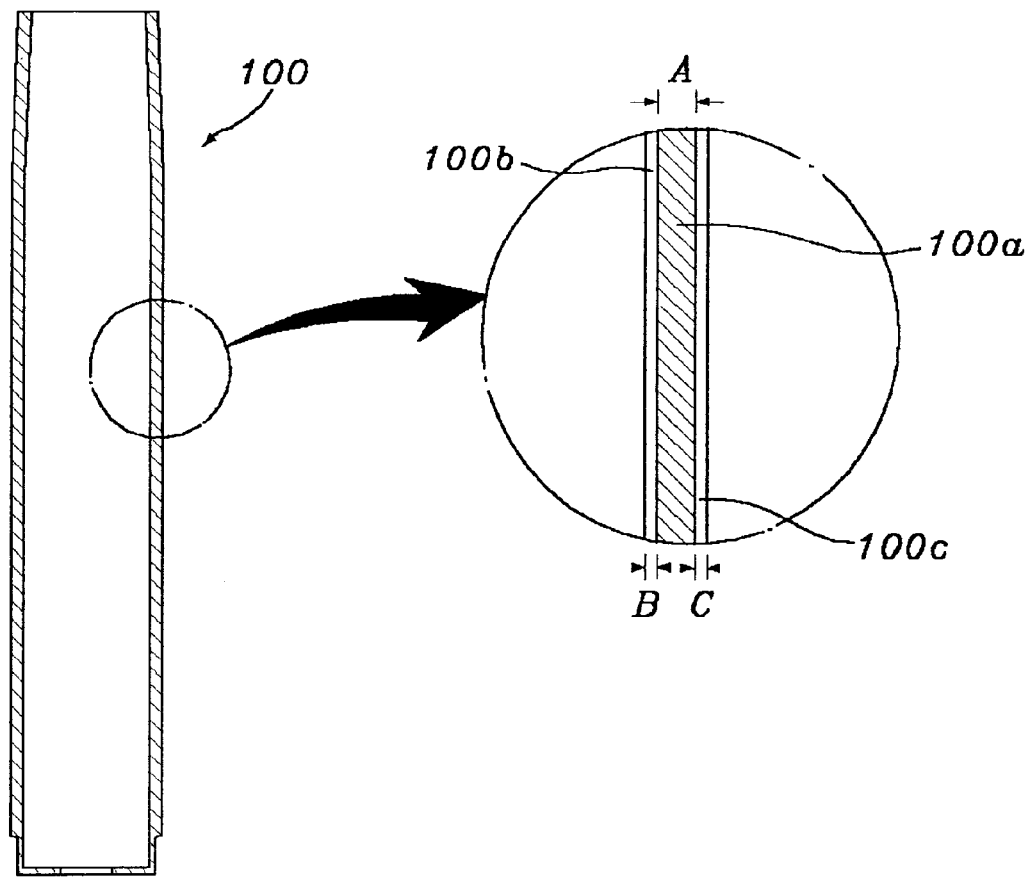
FIGS. 2 and 3 are cross-sectional views for showing a spindle base applied to a gas cylinder type height regulating device according to the present invention.

As shown in FIG. 2, an inner nitration layer 100b and an outer nitration layer 100c is formed on the inner and outer surfaces of a spindle base 100a by a known surface processing and metal coating method so as to have a thickness of 200 to 400 $\mu$m. In order to process the nitration layers on the inner and outer surfaces of the spindle base as above-mentioned, both inlets of the spindle should not be blocked when the nitration layers are processed.

It is preferable that the thickness of the spindle base 100a is 2.5 to 5 times of the sum of the thicknesses of the nitration layers. Namely, the thicknesses of B and C are 200 to 400 $\mu$m, and the thickness of A is 2.5 to 5 times of the thickness of the sum of B and C.

Figure 3:
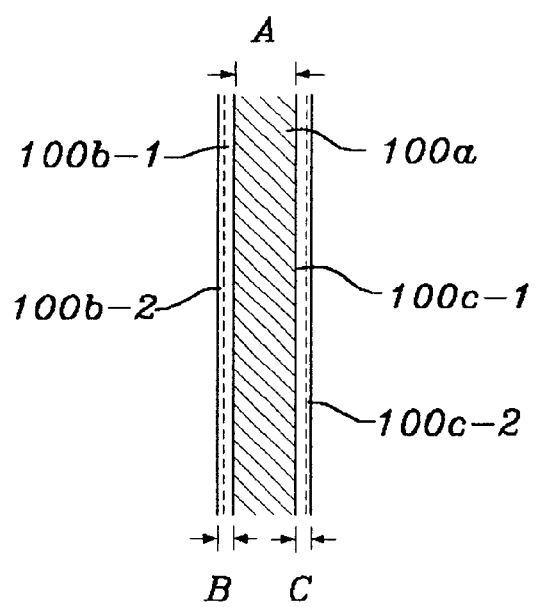

The inner nitration layer 100b and the outer nitration layer 100c can be a structure in which having a different hardness as shown in FIG. 3.

The hardness of the outer side layer 100c-2 of the outer nitration layer is stronger than the inner side layer 100c-1 of the outer nitration layer, and the thickness of the outer side layer 100c-2 is 10 to 20 $\mu$m. Namely, the thickness of the outer side layer 100c-2 is 10 to 20 $\mu$m among the thickness of the outer nitration layer of 200 to 400 $\mu$m. Further, the hardness of the outer side layer 100b-2 of the inner nitration layer is stronger than the strength of the inner side layer 100b-1 of the inner nitration layer, and the thickness of the outside layer 100b-2 is 10 to 20 $\mu$m.

In the structure of the nitration layer of FIG. 3, the thickness C of the outer nitration layer and the thickness B of the inner nitration layer is identical as in FIG. 2, or the thickness B is smaller than the thickness C. However, since the outer layers of the nitration layers has a stronger hardness than the inner layers, a soft nitration layer can effectively absorb the bending stress compared with the structure which is formed with the soft nitration layer.

Especially, if the outer nitration layer is thicker than the inner nitration layer and the hardness of the outer nitration layer is stronger than the inner nitration layer, the compression stress is generated in the outer nitration layer when a reverse bending stress is generated and the tensile stress is generated in the inner nitration layer to effectively absorb the impact of the bending stress.

The inner side layer of the outer nitration layer and the inner side layer of the inner nitration layer is formed by the reaction between the nitrogen and the iron in the nitration layer processing process, and the thickness can be regulated by an engineer.

By forming the nitration layer on the inner and outer surfaces of the spindle base or stacking the nitration layer having a different hardness, the strength of the spindle base, the abrasion resistance, and the corrosion resistance can be improved without enlarging the thickness of the spindle base 100.

Further, a fatigue strength which can correspond to the reverse bending stress applied to the spindle base is provided.

According to the present invention, by forming the nitration layers of the predetermined thicknesses on the inner and outer surfaces of the spindle base, the fatigue strength which corresponds to the reverse bending stress is increased, and the corrosion resistance and the abrasion resistance is improved and the thickness can be decreased.

Further, since the both openings of the spindle is not blocked when the nitration layer is processed in the base of the spindle, the manufacturing process is simplified compared with the structure in which the both openings are blocked and the nitration layer is processed only on the surface of the spindle.

As stated above, preferred embodiments of the present invention are shown and described. Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A height regulating gas device which comprises a spindle base, a cylinder formed in the spindle base, a piston slidably moved in the cylinder, and a spindle having a piston rod having one end connected to a piston and in which the other end of the piston rod is fixed to one end of an outer case and the spindle is moved upward and downward through the outer case based on the piston rod and the outer case, wherein the spindle base is comprised of a metal and nitration layers are formed on the inner and outer surface of the metal.

2. A height regulating device according to claim 1, wherein the spindle base is comprised of iron.

3. A height regulating device according to claim 1, wherein the thickness of the metal of the spindle base is 2.5 to 5 times of the sum of the thicknesses of the nitration layer of the inner surface and the nitration layer of the outer surface.

4. A height regulating device according to claim 3, wherein the thicknesses of the nitration layer of the inner surface and the nitration layer of the outer surface are 200 to 400 μm.

5. A height regulating device according to claim 4, wherein the nitration layer is formed by stacking nitration layers having different hardness and the hardness of the outer side of the nitration layer is greater than the hardness of the inner side.

6. A height regulating device according to claim 6, wherein the thickness of the outside of the nitration layer is 10 to 20 μm.

7. A height regulating device according to claim 3, wherein the thickness of the nitration layer of the outer surface is equal to or greater than the thickness of the nitration layer of the outer surface.

\* \* \* \* \*